US008614996B1

(12) United States Patent
Narendran et al.

(10) Patent No.: US 8,614,996 B1
(45) Date of Patent: Dec. 24, 2013

(54) PREDICTIVE PERSONALITY NEGOTIATION DURING SESSION NEGOTIATION

(75) Inventors: Rajveen Narendran, Olathe, KS (US); Andrew M. Wurtenberger, Olathe, KS (US); Sreekar Marupaduga, Overland Park, KS (US); Bret D. Vondemkamp, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1071 days.

(21) Appl. No.: 11/954,827

(22) Filed: Dec. 12, 2007

(51) Int. Cl.
*H04M 3/00* (2006.01)
*H04M 7/00* (2006.01)

(52) U.S. Cl.
USPC ............................. 370/338; 370/331; 370/335

(58) Field of Classification Search
USPC ......................................................... 370/338
See application file for complete search history.

(56) References Cited

U.S. PATENT DOCUMENTS

| 7,065,089 | B2 * | 6/2006 | Kuhl et al. ................. 370/395.2 |
| 7,106,779 | B2 * | 9/2006 | Bender et al. ................. 375/130 |
| 7,161,942 | B2 * | 1/2007 | Chen et al. ....................... 370/392 |
| 7,602,723 | B2 * | 10/2009 | Mandato et al. ............... 370/236 |
| 7,653,735 | B2 * | 1/2010 | Mandato et al. ............... 709/231 |
| 7,848,257 | B1 * | 12/2010 | Narendran et al. ........... 370/254 |
| 8,284,752 | B2 * | 10/2012 | Ketchum et al. ............... 370/349 |
| 8,472,473 | B2 * | 6/2013 | Ketchum et al. ............... 370/466 |
| 2004/0156388 | A1 * | 8/2004 | Bush .............................. 370/465 |
| 2005/0036463 | A1 * | 2/2005 | Nesargi et al. ................. 370/335 |
| 2005/0169171 | A1 * | 8/2005 | Cheng et al. .................... 370/229 |
| 2006/0039313 | A1 * | 2/2006 | Chou et al. ..................... 370/328 |
| 2006/0153079 | A1 * | 7/2006 | Yoon et al. ..................... 370/235 |
| 2007/0115816 | A1 * | 5/2007 | Sinivaara ....................... 370/230 |
| 2007/0201366 | A1 * | 8/2007 | Liu ................................. 370/235 |
| 2008/0013488 | A1 | 1/2008 | Garg |
| 2008/0056168 | A1 * | 3/2008 | Sinnarajah et al. ........... 370/310 |
| 2008/0089228 | A1 * | 4/2008 | Lin et al. ........................ 370/230 |
| 2008/0117859 | A1 | 5/2008 | Shahidi |
| 2008/0247388 | A1 * | 10/2008 | Horn .............................. 370/389 |
| 2009/0209223 | A1 | 8/2009 | Kone |
| 2010/0040018 | A1 | 2/2010 | Appani |

OTHER PUBLICATIONS

Unpublished U.S. Appl. No. 12/206,487, entitled "Selective Personality Negotiation During Session Negotiation," filed Sep. 8, 2008 in the name of inventor Rajveen Narendran.
Notice of Allowance mailed Aug. 18, 2011 for U.S. Appl. No. 12/206,487.
Non-Final Office Action from U.S. Appl. No. 12/206,487 mailed Apr. 28, 2011.

* cited by examiner

*Primary Examiner* — Guang Li

(57) ABSTRACT

Methods and systems are provided for implementing predictive personality negotiation during session negotiation. In an embodiment, an EV-DO access node negotiates a first session with an access terminal, which involves negotiating a comprehensive set of personalities with the access terminal for the first session. The access node then records a list of personalities actually used by the access terminal during the first session. That list is a subset of the comprehensive set. The access node then negotiates a second session with the access terminal, which involves negotiating only that subset of personalities with the access terminal for the second session.

15 Claims, 3 Drawing Sheets

PREDICTIVE PERSONALITY NEGOTIATION DURING SESSION NEGOTIATION

BACKGROUND

1. Technical Field

The present invention relates to wireless communications, and, more particularly, to configuration of access nodes and access terminals in wireless communication systems.

2. Description of Related Art

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Recently, service providers have introduced mobile stations and wireless networks that communicate using a protocol known as EV-DO, which stands for "Evolution Data Optimized." EV-DO networks, operating in conformance with industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some mobile stations, known as hybrid mobile stations or hybrid access terminals, can communicate with both 1x networks and EV-DO networks.

In the EV-DO context, a mobile station is typically referred to as an access terminal, while the network entity with which the access terminal communicates over the air interface is known as an access node. The access node typically includes a device known as a radio network controller (RNC), which is similar to a base station controller (BSC) in 1x networks. The access node also includes one or more base transceiver stations (BTSs) or "Node-Bs," each of which include one or more antennas that radiate to define respective wireless coverage areas. Among other functions, the RNC controls one or more BTSs, and acts as a conduit between the BTSs and an entity known as a packet data serving node (PDSN), which provides access to a packet-data network. Thus, when positioned in one of these wireless coverage areas, an access terminal may communicate over the packet-data network via the access node and the PDSN.

To initiate connectivity, when powered on in a coverage area of an access node, an access terminal may send what is known as a Universal Access Terminal Identifier (UATI) request to the access node. The access node may respond by granting a UATI to the access terminal in a message known as a UATI response. This UATI response typically contains the granted UATI, which then serves to identify the access terminal to the access node for some period of time.

After acquiring a UATI, the access terminal will typically communicate with the access node over the air interface to set up what is referred to as a "session." Essentially, an access terminal that has a session with an access node can engage in packet-data communication over the packet-data network to which the access node and the PDSN provide access. Conversely, an access terminal that does not have a session with an access node can not engage in packet-data communication over the packet-data network.

As part of setting up the session, the access terminal sends a connection request to the access node, requesting an air-interface connection. The access node will responsively work to establish the air-interface connection with the access terminal, which involves the access node instructing the access terminal to communicate with the access node over what is known as a traffic channel. This traffic channel takes the form of particular timeslots on the forward link, during which the access node sends data to the access terminal, and a particular CDMA channel on the reverse link, over which the access terminal sends data to the access node.

In addition to establishing the connection with the access terminal, the access node takes a number of other actions, one of which is to validate that the access terminal is authorized to engage in communication via the access node. Another such action is to set up a radio-packet (e.g., A10/A11) connection between the access node and the PDSN for the access terminal. The access node also facilitates establishment of a data link (e.g., a point-to-point protocol (PPP) connection) between the access terminal and the PDSN. Furthermore, an entity such as the PDSN or a Mobile-IP home agent assigns an IP address to the access terminal.

Once session negotiation (described further below) is complete, the access terminal has a session with the access node, and can therefore communicate over the packet-data network via the access node and the PDSN. Typically, the air-interface connection is then torn down, freeing up those resources for other access terminals. Both the network and the access terminal maintain data pertaining to the rest of what was established, however, including the IP address, radio-packet connection, and data link. This transition from having a traffic channel to not having one is referred to as the access terminal going from active to dormant.

Thereafter, if the access terminal wants to initiate packet-data communication, it sends another connection request to the access node, which then assigns a traffic channel to the access terminal. If, however, the access node receives data addressed to the access terminal, the access node typically sends a page to the access terminal over a paging channel, and assigns a traffic channel to the access terminal. The access terminal can then communicate over the packet-data network, using the traffic channel, IP address, radio-packet connection, and data link.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

Figure 1:
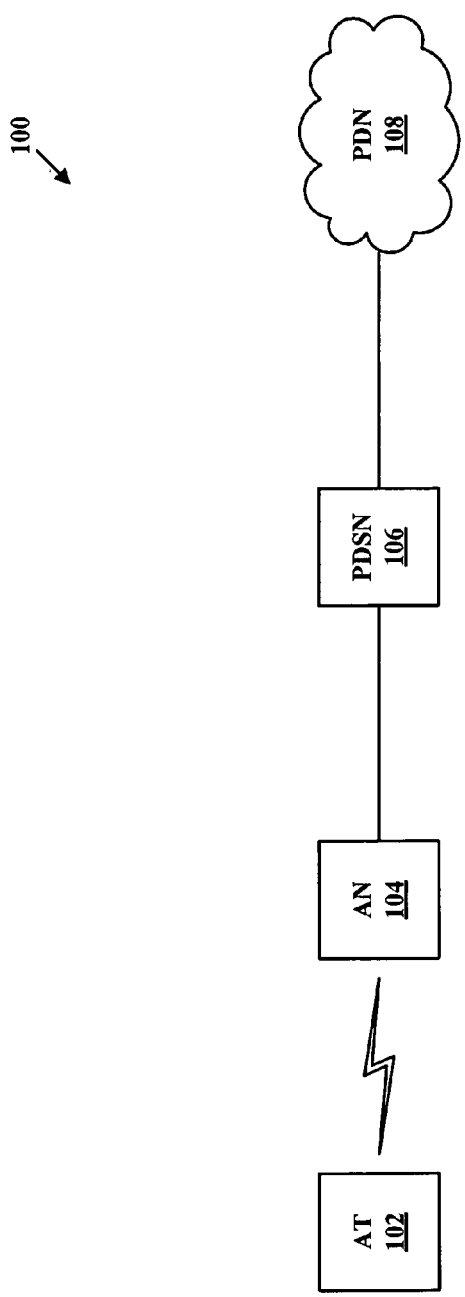
FIG. 1 is a simplified block diagram of a communication system, in accordance with exemplary embodiments.

In addition to VoIP communication, access terminals frequently engage in other types of packet-data communication, such as instant messaging (IM) and web browsing. Each instance of an access terminal engaging in a type of packet-data communication for a period of time may be deemed a "packet flow," which would typically involve Internet Protocol (IP) packets being sent and received by the access terminal. For example, a given VoIP call may be referred to as a VoIP packet flow. Thus, as examples, an access terminal may engage in VoIP packet flows, IM packet flows, push-to-talk (PTT) packet flows, streaming-video packet flows, streaming-audio packet flows, video-telephony packet flows, and best-effort packet flows such as web-browsing packet flows and file-transfer-protocol (FTP) packet flows.

To address the fact that access terminals engage in these various types of packet flows, a particular revision of EV-DO specifications, known as IS-856, Rev. A ("EV-DO-A"), provides for what are known as profile IDs, which are identifiers associated on a one-to-one basis with types of packet flows. Thus, one profile ID may be associated with VoIP packet flows (i.e., "conversational voice"), while another may be associated with best-effort packet flows, and so on. Again, an access terminal may be able to communicate according to more than one profile ID, which is another way of stating that it can engage in more than one type of packet flow. IS-856, Revision A and IS-856, Release 0 are hereby incorporated herein by reference.

Furthermore, to be able to participate in one or more of these various types of packet flows, an access terminal may run (i.e., launch, enable, execute, etc.) particular communication applications, perhaps in response to receiving one or more user commands. As an example, to be able to participate in push-to-talk (PTT) packet flows, the access terminal may enable a PTT application. As another example, to be able to participate in IM packet flows, an access terminal may run an IM application. As yet another example, to be able to engage in web-browsing packet flows, an access terminal may launch a web browser. And so on.

During (and typically near the end of) session negotiation, the access terminal and the access node negotiate a set of profile IDs for the access terminal to use during the session; in other words, they agree as to the types of packet flows in which the access terminal is capable of engaging and in which the access terminal is permitted to engage during the session. Typically prior to this profile-ID negotiation, the access node and the access terminal negotiate a set of what are known as "personalities" for the access terminal. This negotiated set of personalities then defines, in some ways more broadly than profile-ID negotiation, the types of EV-DO communication in which the access terminal will be eligible to engage during the session.

During a typical personality negotiation, an access terminal and an access node may negotiate approximately five personalities, which may take on the order of four or five seconds. These personalities relate to which release/revision of IS-856 is supported, as well as more specific functionality, and are often correlated with different types of packet flows having differing qualities of service (QoS). For example, a "Personality 0" may relate to IS-856, Rel. 0, and be associated with Rel. 0 best-effort data transfer. Furthermore, a "Personality 1" may also relate to IS-856, Rel. 0, but also include functionality pertaining to dynamically-updateable reverse-link transitional parameters, which relate to the parameters and settings associated with access terminals stepping up or stepping down their reverse-link data-transfer rates.

Furthermore, a "Personality 2" may pertain to IS-856, Rev. A, and be associated with Rev. A best-efforts data transfer. A "Personality 3" may also pertain to Rev. A, with the added functionality of providing QoS (for multi-packet-flow communication). Finally, a "Personality 4" may also pertain to Rev. A, with the functionality of Personality 3 as well as with additional functionality such as robust overhead header compression, as well as increased efficiencies for handoffs (i.e. for providing enhanced multi-packet-flow communication). And other possibilities exist as well, including providing a different number and different types of personalities, as these five personalities are provided by way of illustration and not limitation.

Once personality negotiation is complete, the access node and the access terminal then conduct the above-mentioned profile-ID negotiation, to agree on a set of profile IDs that the access terminal may use during the ensuing session. During the session, when the access terminal is communicating via the access terminal according to the agreed-upon set of profile IDs, and in particular as part of setting up a packet flow, either the access terminal or the access node, or both, may send the other a message known as a ReservationOnRequest (RoR). The RoR includes at least one profile ID, indicating the type of packet flow that is being requested.

Once an RoR has been sent and acknowledged, the access terminal has an "open reservation" on the assigned traffic channel. This open reservation is associated with the profile ID that was included in the RoR; in other words, the open reservation is associated with the type of packet flow in which the access terminal is then able to engage. Note that an access terminal may have more than one open reservation on the traffic channel at one time, corresponding to the fact that the access terminal can engage in more than one packet flow at one time.

Each packet flow in which the access terminal engages during the session is also associated with a personality. As examples, a web-browsing packet flow may be an instance of the access terminal communicating according to personality 0 (Rel. 0, best-efforts), while a video-telephony packet flow may be an instance of the access terminal communicating according to personality 3 (Rev. A with QoS); and so on. The access node and the network in general may then use the personality and/or profile-ID information associated with a packet flow to apply (or not apply) a particular QoS to the packet flow, which essentially means providing a particular level of packet-forwarding (or "expedited-forwarding") treatment to certain packet flows. This traffic shaping is also known as "DiffServ" ("differentiated services").

With respect to personality negotiation, in a typical implementation according to IS-856, Rev. A, RNC vendors may determine for themselves how many and what set of personalities will be negotiated during session negotiation with access terminals. So some vendors' RNCs may be arranged to negotiate all five of these personalities with each access terminal; some vendors' RNCs may be arranged to negotiate a particular subset of three of the five; another vendor's RNCs may be arranged to negotiate a different subset of three, and so on.

Furthermore, even if the substance of the personalities is the same across RNC vendors, the numbering of the personalities may be different. Thus, there is inconsistency across vendors, which can preclude inter-vendor handoffs, since sessions often cannot be transferred from a source RNC to a target RNC unless the session parameters (i.e. credentials) (including personality information) always negotiated by the source RNC closely (perhaps exactly) match those always negotiated by the target RNC. There is also negotiation of personalities that are never used, such as a laptop card (i.e. an "air card") that will do only best-efforts data transfers negotiating personalities 3 and 4 described above. And there are other problems.

In accordance the present invention, rather than an access node (i.e. RNC) conducting a standard personality negotiation of the same set of personalities with every access terminal every time, resulting in a situation where many personalities are negotiated never to be used, and further resulting in a situation where different access nodes negotiate different respective sets of personalities as a matter of their normal course, resulting in inconsistency in session credentials across access nodes (e.g. across RNC vendors), an access node will instead conduct an initial personality negotiation with a given access terminal in connection with setting up a first session. During this initial personality negotiation, the access node negotiates a comprehensive set of personalities—such as all available personalities—with the access terminal.

During the first session, the access node records which personalities correspond with any actual packet flows engaged in by the access terminal. Thus, the access node records a subset of the aforementioned comprehensive set of personalities. Note that this subset could consist of all or less than all of the personalities in the comprehensive set. After termination (e.g. expiration) of the first session, the given access terminal may seek to set up a second session with the access node. During negotiation of this second session, the access node negotiates only the subset of personalities recorded as used during the first session with that particular access terminal. In this manner, excessive personality negotiation is prevented (since only the subset is negotiated, rather than all), and the likelihood of inter-vendor handoffs being successful increases (since each access terminal's session data has been simplified, decreasing the potential for inconsistencies). Preferably, all RNCs/access nodes would use the personality-numbering convention detailed above, or at least a consistent convention, further facilitating handoffs.

Thus, in some embodiments, the access node and the access terminal may, with respect to negotiating a session other than an initial session, negotiate only those personalities used by the access terminal since the previous session negotiation. In other embodiments, they may negotiate the personalities used by the access terminal in the previous two sessions, or perhaps the previous five sessions, or perhaps in an immediately-preceding time period, such as the past 24 hours, the past week, the past month, etc. And other manners of delineating the subset of personalities to be negotiated during the negotiation of an instant session are certainly possible as well, without departing from the scope and spirit of the present invention.

2. Exemplary Architecture a. Exemplary Communication System

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal 102, an access node 104, a PDSN 106, and a packet-data network (PDN) 108. Note that additional entities not depicted in FIG. 1 could be present as well. As an example, there could be more than one access terminal in communication with access node 104; furthermore, there could be additional entities in communication with PDN 108. Also, there could be one or more devices and/or networks making up at least part of one or more of the communication links depicted in FIG. 1. As an example, there could be one or more routers, switches, or other devices or networks on the link between PDSN 106 and PDN 108.

Access terminal 102 may be any mobile device arranged to carry out the access-terminal functions described herein. Access terminal 102 may include a user interface, a wireless-communication interface, a processor, and data storage comprising instructions executable by the processor for carrying out those access-terminal functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more access nodes over an air interface. As an example, the chipset could be suitable for engaging in EV-DO (Rel. 0 and/or Rev. A) communications. The chipset or wireless-communication interface in general may also be able to communicate with a CDMA network, a Wi-Fi network, and/or one or more additional types of wireless networks. The processor and data storage may be any suitable components known to those of skill in the art. As examples, access terminal 102 could be or include a cell phone, a PDA, a computer, a laptop, an air card, a hybrid IS-2000/IS-856 device, and/or a multi-mode Wi-Fi/cellular device.

Access node 104 may be any one or any combination of network elements arranged to carry out the access-node functions described herein. As such, access node 104 may include a communication interface, a processor, and data storage comprising instructions executable by the processor to carry out those access-node functions. The communication interface may include one or more antennas and chipsets or other components for providing one or more EV-DO coverage areas such as cells or sectors, for communicating with access terminals such as access terminal 102. The communication interface may also include a wired packet-data interface such as an Ethernet interface for communicating directly or over one or more networks with PDSN 106. Access node 104 may include one or more base transceiver stations (BTSs) (or "Node-Bs"), as well as one or more radio network controllers (RNCs).

PDSN 106 may be any networking server or other device arranged to carry out the PDSN functions described herein. As such, PDSN 106 may include a communication interface, a processor, and data storage comprising instructions executable by the processor for carrying out those PDSN functions. The communication interface may include a wired packet-data interface such as an Ethernet interface for communicating with access node 104 and over PDN 108. Note that, instead or in addition, PDSN 106 may comprise a wireless interface for communicating with access node 104 and over PDN 108. And PDSN 106 may use the same interface or separate interfaces for communicating with access node 104 and for communicating over PDN 108.

PDN 108 may include one or more wide area networks, one or more local area networks, one or more public networks such as the Internet, one or more private networks, one or more wired networks, one or more wireless networks, and/or one or more networks of any other variety. Devices in communication with PDN 108 may exchange data using a packet-switched protocol such as IP, and may be identified by an address such as an IP address.

3. Exemplary Operation a. A First Exemplary Method

Figure 2:
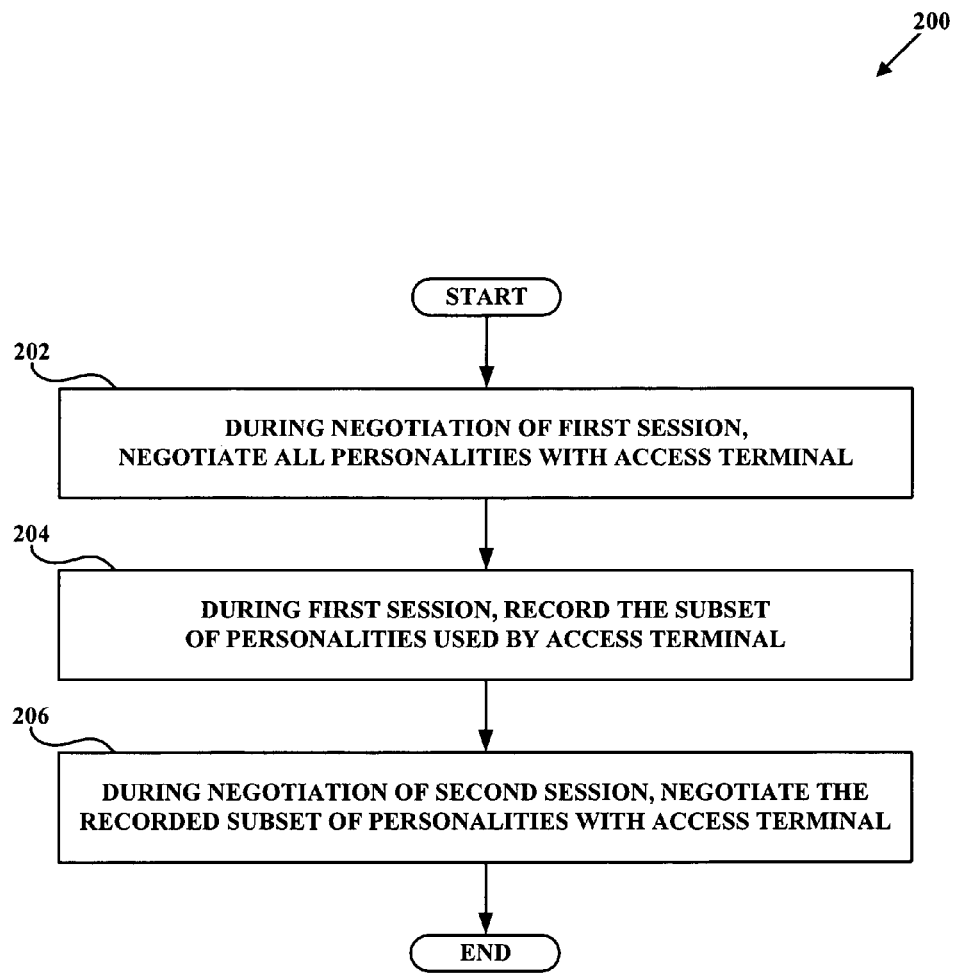
FIG. 2 is a flowchart of a method, in accordance with exemplary embodiments.

FIG. 2 depicts a flowchart of an exemplary method, in accordance with an exemplary embodiment. As shown in FIG. 2, method 200 begins at step 202, when access node 104 negotiates a first session with access terminal 102, which involves negotiating a comprehensive set of personalities with access terminal 102 for the first session. At step 204, access node 104 records a first list of personalities actually used by access terminal 102 during the first session, where the first list of personalities makes up a first subset (i.e. some or all) of the comprehensive set. At step 206, access node 104 negotiates a second session with access terminal 102, which involves negotiating only the first subset of personalities with access terminal 102 for the second session. These steps are further explained in the following subsections.

i. Negotiate Comprehensive Set of Personalities for First Session

At step 202, access node 104 negotiates a first session with access terminal 102, which involves negotiating a comprehensive set of personalities with access terminal 102 for the first session. This comprehensive set of personalities may consist of all personalities provided by access node 104. Further, it may include (a) at least one personality associated with IS-856, Release 0 and (b) at least one personality associated with IS-856, Revision A. In some embodiments, the comprehensive set of personalities may consist of five personalities. In particular, the breakdown may be (a) two personalities associated with IS-856, Release 0 and (b) three personalities associated with IS-856, Revision A. In one embodiment, the comprehensive set is the Personalities 0 through 4 described above.

ii. Record Subset of Comprehensive Set Used During First Session

At step 204, access node 104 records a first list of personalities actually used—e.g. for engaging in at least one packet flow—by access terminal 102 during the first session. The first list of personalities makes up a first subset of the comprehensive set of personalities, in other words some or all of the comprehensive set. Note that, as stated, the first subset may consist of some of the personalities of the comprehensive set; in other words, the first subset may be a proper subset of the comprehensive set.

iii. Negotiate Subset of Personalities for Second Session

At step 206, access node 104 negotiates a second session with access terminal 102, which involves negotiating only the first subset of personalities with access terminal 102 for the second session. In this way, the negotiation of the second session will likely take less time than the negotiation of the first session, and it will also be more likely that the second session could be handed off if necessary to another RNC/access node, since the session-credential information (including personality information) has been streamlined.

Furthermore, assuming no handoff, access node 104 may then record a second list of personalities actually used by access terminal 102 during the second session, where the second list of personalities makes up a subset of the first subset, consisting of some or all of the first subset. If access terminal 102 later negotiates a third session with access node 104, then access node 104 would negotiate only the second subset with access terminal 102 for that third session.

Thus, if access node 104 negotiated {Personality 0, Personality 1, Personality 2, Personality 3, Personality 4} with access terminal 102 for the first session (in step 202), and access terminal 102 then used Personalities 2 and 4 during the first session (which would have been recorded by access node 104 in step 204), access node 104 would then have negotiated {Personality 2, Personality 4} with access terminal 102 for the second session (in step 206). If access terminal 102 then used only Personality 2 during the second session, then access node 104 would negotiate {Personality 2} with access terminal 102 for the third session.

And it can thereby be seen that, across serial session negotiations, the set of negotiated personalities is winnowed to that actually used by a given access terminal. And of course, a reset mechanism back to negotiating the comprehensive set could be put into place. This may be administered automatically after a sufficient time gap between session negotiations, or may just as well be able to be manually triggered by a user and/or network administrator. And other possibilities exist as well, without departing from the invention.

In some embodiments, a second access terminal may come along; access node 104 may then negotiate an initial (for that access terminal) session with the second access terminal, which involves negotiating the comprehensive set of personalities with the second access terminal for the second access terminal's initial session. Note that, for their initial sessions, access node 104 separately negotiates the same comprehensive set of personalities with access terminal 102 and with the second access terminal.

Access node 104 may then record a second list of personalities actually used by the second access terminal during that access terminal's initial session, where the second list of personalities is a second subset (i.e. some or all) of the comprehensive set. Access node 104 may then negotiate with the second access terminal to set up that access terminal's second session; during that negotiation, access node 104 negotiates only the second subset of personalities with the second access terminal. And in this way the present invention is clearly extendible to any number of access terminals.

b. A Second Exemplary Method

Figure 3:
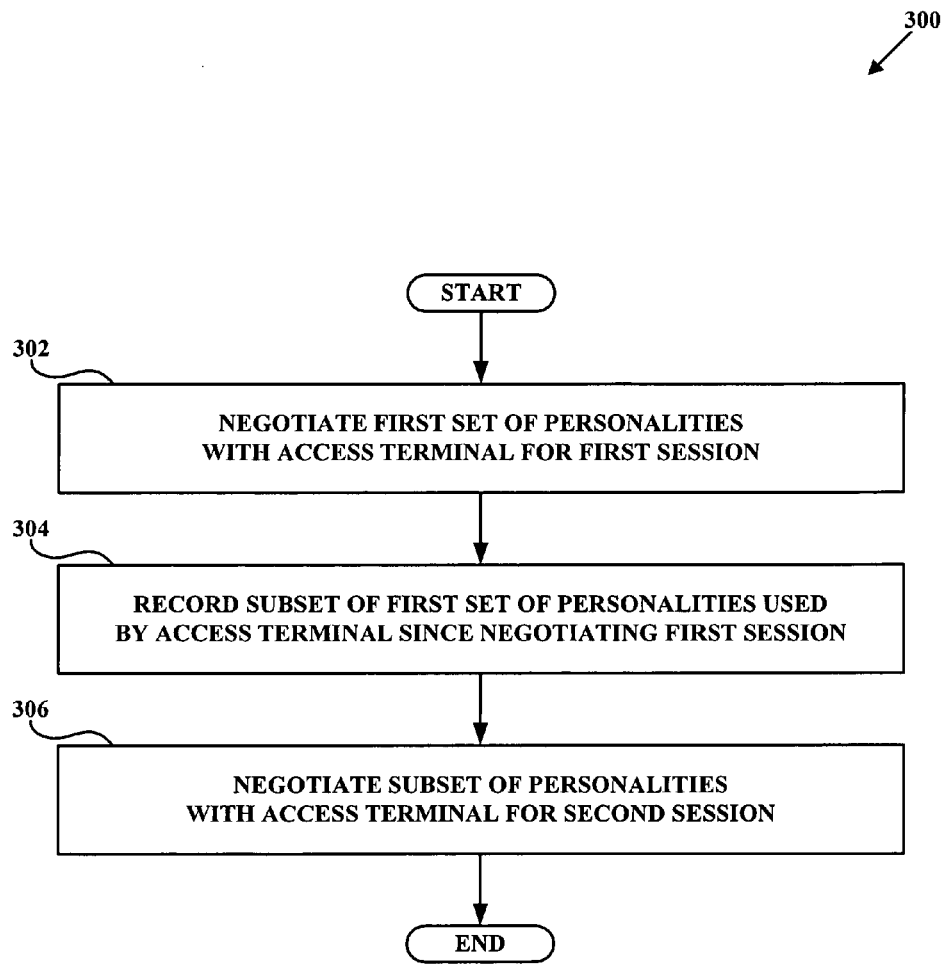
FIG. 3 is a flowchart of a method, in accordance with exemplary embodiments.

FIG. 3 is a flowchart of a second exemplary method, in accordance with an exemplary embodiment. In particular, FIG. 3 depicts a method 300, which may be carried out by an access node such as access node 104, perhaps in cooperation with one or more other entities. Method 300 is similar to method 200, and thus is not described in as great of detail.

As shown in FIG. 3, method 300 begins at step 302, when access node 104 negotiates a first session with access terminal 102, which involves negotiating a first set of personalities with access terminal 102 for the first session. At step 304, access node 104 records a list of personalities actually used by access terminal 102 since access node 104 negotiated the first session with access terminal 102, where the list of personalities makes up a subset (i.e. some or all) of the first set of personalities. At step 306, access node 104 negotiates a second session with access terminal 102, which involves negotiating only the subset of personalities with access terminal 102 for the second session.

Note that, with respect to the second session, method 300 involves negotiating the personalities used by access terminal since the negotiation of the first session. This is not limited to successive session negotiations: that is, access node 104 may negotiate with access terminal 102 all of the personalities that access terminal 102 has used over a preceding time period, such as the preceding 24 hours, week, month, etc; it may also mean that access node 104 negotiates with access terminal 102 all of the personalities that access terminal 102 has used over the previous two sessions, three sessions, five sessions, ten sessions, etc. In general, this means that, as used in FIG. 3, this description of FIG. 3, and claim 15, the "first session" and the "second session" could have one or more sessions occur in between them. The only limitation is that the second session occurs later in time than the first. This is not to limit the reading of any other part of this written description, and figure, or any other claim, only to explain some.

4. Conclusion

Various exemplary embodiments have been described above. Those skilled in the art will understand, however, that changes and modifications may be made to those examples without departing from the scope of the claims.

What is claimed is:

1. A method comprising:
    an access node negotiating a first session with a first access terminal, wherein negotiating the first session with the first access terminal comprises negotiating a comprehensive set of two or more personalities with the first access terminal for the first session;
    the access node recording a first list of personalities actually used by the first access terminal for engaging in at least one packet flow during the first session, wherein the first list of personalities makes up a first subset of the comprehensive set of personalities, wherein the first subset consists of one or more but not all of the personalities in the comprehensive set; and
    the access node negotiating a second session with the first access terminal, wherein negotiating the second session with the first access terminal comprises negotiating only the first subset of personalities with the first access terminal for the second session.

2. The method of claim 1, wherein the access node comprises an Evolution Data Optimized (EV-DO) access node, wherein the first access terminal comprises an EV-DO access terminal, wherein either or both of the access node and the first access terminal operate in compliance with (a) IS-856, Revision A or (b) both IS-856, Release 0 and IS-856, Revision A.

3. The method of claim 2, wherein the access node comprises a radio network controller (RNC) and at least one base transceiver station (BTS).

4. The method of claim 1, wherein the first access terminal comprises at least one of a cellular telephone, a personal digital assistant (PDA), a computer, a laptop computer, a laptop air card, and a hybrid access terminal.

5. The method of claim 1, wherein the comprehensive set of personalities consists of all personalities provided by the access node.

6. The method of claim 5, wherein the comprehensive set of personalities comprises (a) at least one personality associated with IS-856, Release 0 and (b) at least one personality associated with IS-856, Revision A.

7. The method of claim 1, wherein the comprehensive set of personalities consists of five personalities.

8. The method of claim 7, wherein the comprehensive set of personalities consists of (a) two personalities associated with IS-856, Release 0 and (b) three personalities associated with IS-856, Revision A.

9. The method of claim 1, further comprising using the same numbering convention of the personalities in the comprehensive set across at least two access-node vendors and/or across at least two radio-network-controller-(RNC) vendors.

10. An Evolution Data Optimized (EV-DO) access node comprising:
    an wireless-communication interface for providing an EV-DO coverage area;
    a processor; and
    data storage comprising instructions executable by the processor for:
        negotiating a first session with a first access terminal, wherein negotiating the first session with the first access terminal comprises negotiating a comprehensive set of two or more personalities with the first access terminal for the first session;
        recording a first list of personalities actually used by the first access terminal for engaging in at least one packet flow during the first session, wherein the first list of personalities makes up a first subset of the comprehensive set of personalities, wherein the first subset consists of one or more but not all of the personalities in the comprehensive set; and
        negotiating a second session with the first access terminal, wherein negotiating the second session with the first access terminal comprises negotiating only the first subset of personalities with the first access terminal for the second session.

11. The access node of claim 10, wherein the access node comprises a radio network controller (RNC) and at least one base transceiver station (BTS).

12. The access node of claim 10, wherein the comprehensive set of personalities consists of all personalities provided by the access node.

13. The access node of claim 12, wherein the comprehensive set of personalities comprises (a) at least one personality associated with IS-856, Release 0 and (b) at least one personality associated with IS-856, Revision A.

14. The access node of claim 10, wherein the comprehensive set of personalities consists of (a) two personalities associated with IS-856, Release 0 and (b) three personalities associated with IS-856, Revision A.

15. A method comprising:
    an access node negotiating a first session with an access terminal, wherein negotiating the first session with the access terminal comprises negotiating a first set of two or more personalities with the access terminal for the first session;
    the access node recording a list of personalities actually used by the access terminal for engaging in at least one packet flow since negotiating the first session with the access terminal, wherein the list of personalities makes up a subset of the first set of personalities, wherein the subset consists of one or more but not all of the personalities in the first set; and
    the access node negotiating a second session with the access terminal, wherein negotiating the second session with the access terminal comprises negotiating only the subset of personalities with the access terminal for the second session.

* * * * *